US005298142A

United States Patent [19]

Gassner

[11] Patent Number: 5,298,142

[45] Date of Patent: Mar. 29, 1994

[54] CLEANING DEVICE FOR A CONTACT ELEMENT OF A CAR-BODY SKID IN A PAINT PLANT

[75] Inventor: Franz Gassner, Stuttgart, Fed. Rep. of Germany

[73] Assignee: Durr GmbH, Stuttgart, Fed. Rep. of Germany

[21] Appl. No.: 781,120

[22] Filed: Oct. 22, 1991

[30] Foreign Application Priority Data

Feb. 2, 1991 [DE] Fed. Rep. of Germany ....... 4103171

[51] Int. Cl.[5] ...................... C25D 13/00; C25D 13/12; B65G 45/16

[52] U.S. Cl. .......................... 204/300 EC; 204/181.7; 204/299 EC; 198/499

[58] Field of Search ................ 198/499; 204/300 EC, 204/299 EC, 180.2, 180.3, 180.5, 180.6, 180.7, 180.8, 180.9, 181.1, 181.2, 181.3, 181.4, 181.5, 181.6

[56] References Cited

U.S. PATENT DOCUMENTS 3,994,388 11/1976 Reiter ................................ 198/499
4,263,122 4/1981 Urquhart ...................... 204/300 EC
4,280,616 7/1981 Wadensten ......................... 198/499
4,290,520 9/1981 Rhodes .............................. 198/499
4,533,035 8/1985 Reiter ................................ 198/499
4,664,250 5/1987 Jakobs ............................... 198/499
4,754,868 7/1988 Hughes et al. ..................... 198/499
4,795,024 1/1989 Eatwell .............................. 198/499
4,838,409 6/1989 Rappen ......................... 198/499 X
4,987,993 1/1991 Dohmeier .

*Primary Examiner*—John Niebling
*Assistant Examiner*—John S. Starsiak, Jr.
*Attorney, Agent, or Firm*—Flynn, Thiel, Boutell & Tanis

[57] ABSTRACT

Cleaning device for a web-like or rib-like contact element (contact blade) of a car-body skid for a plant for cathodic dip electropriming, which comprises at least one cleaning element resiliently engageable on the contact blade and moving relative thereto, wherein for simple, careful and effective removal of impurities from the contact blade the cleaning element is knife-like or spatula-like in design and is displaceable along the contact blade over its entire length in the longitudinal direction of the contact blade.

21 Claims, 5 Drawing Sheets

CLEANING DEVICE FOR A CONTACT ELEMENT OF A CAR-BODY SKID IN A PAINT PLANT

Figure 1:
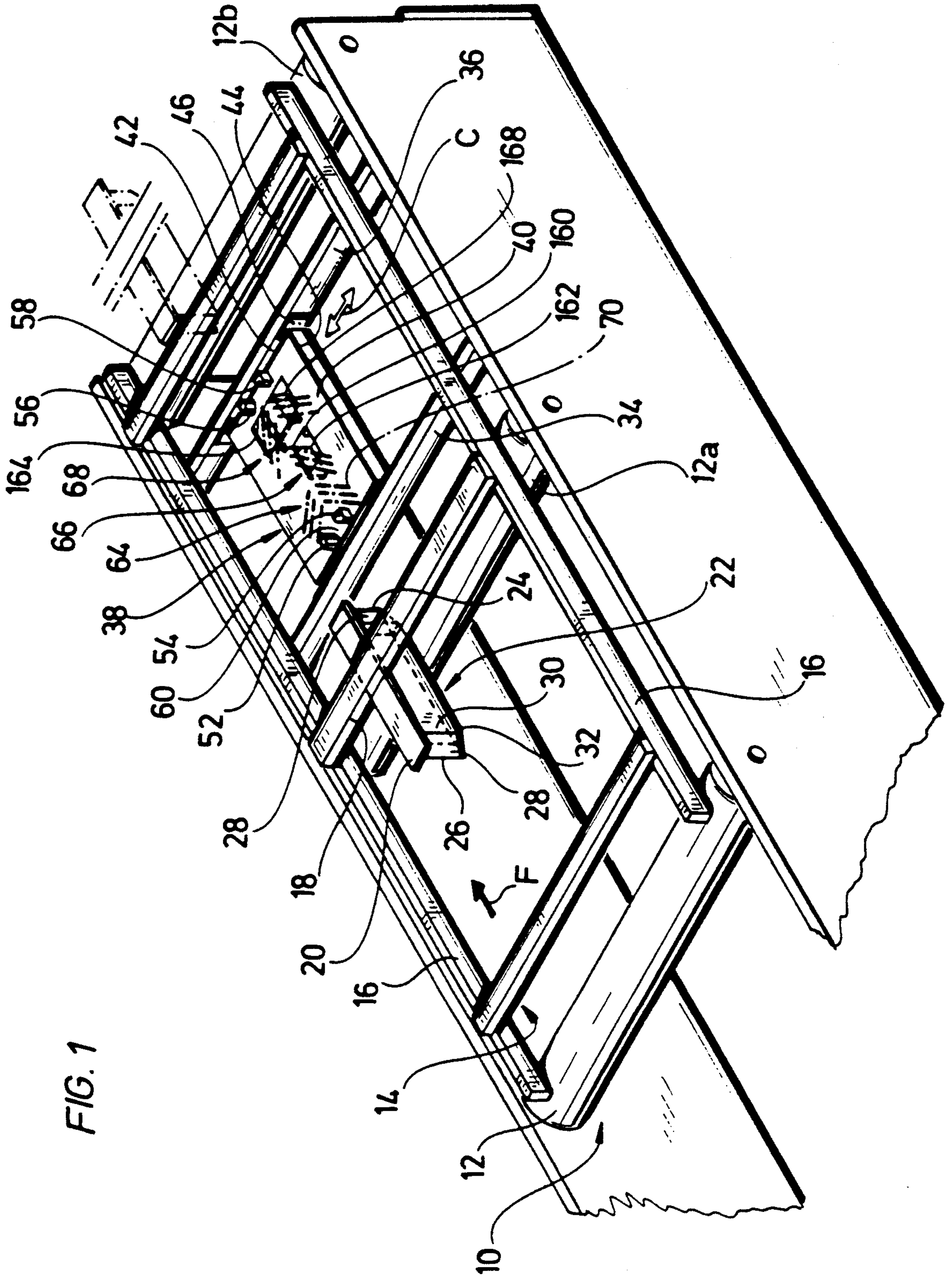

The invention relates to a cleaning device for a web-like or rib-like contact element (contact blade) of a car-body skid for a plant for cathodic dip electropriming, comprising at least one cleaning element resiliently engageable on the contact blade and moving relative thereto.

In the so-called cathodic dip electropriming process, which is used, in particular, for priming motor vehicle bodies, the motor vehicle bodies to be painted are placed on carriages, so-called skids, and together with these fed on a conveyor through a dip tank filled with the paint which is to be applied. In the dip tank the skids and the motor vehicle bodies are connected via a contact device with the negative pole of an electrical voltage source, the contact blade of the pertinent skid being part of the contact device.

In known paint plants, the contact blade of the skids is cleaned downstream of the drier, through which the painted car bodies pass on the skids, in order to remove paint attached thereto which would otherwise prevent a good contact between a contact bar or strip of the contact device and the contact blade when the skids again pass through the paint plant with new car bodies. In known paint plants the cleaning device consists of brushing devices which can be pivoted onto the blades of the skids. However, the paint layer burnt in in the drier can be removed with the brushes of these devices only with difficulty or incompletely. If the known brushing devices were to be arranged upstream of the drier, the results obtained would not be any better because then the brushes would only smear the paint on the contact blades. Contact blades which have not be brushed for an adequate length of time result not only in an unreliable contact but to sparkovers in the contact device which lead to erosions at the contact strip and the contact blades. For this reason, the known paint plants have persisted with cleaning of the contact blades downstream of the drier. In this respect considerable brushing times have to be taken into account and this leads to considerable wear and tear on the contact blades and the pivotable round brushes made of steel or plastic. In addition, this results in uneven surfaces on the contact blades which also lead to sparkovers in the contact device and therefore to erosions. The pivotable brushing devices are also relatively complicated, the disadvantages of the known brushing devices described above require high maintenance resources and faulty coatings can, nevertheless, occur in the dip tank due to defective contacting of the skids.

The object underlying the invention was therefore to provide a cleaning device for the contact elements or contact blades of car-body skids for use in a cathodic dip electropriming plant which is simpler than the known cleaning device described and still cleans the skid contact elements more effectively.

Proceeding on the basis of a cleaning device of the type described at the outset, this object may be accomplished in accordance with the invention in that the cleaning element is knife-like or spatula-like in design and is displaceable along the contact blade in the longitudinal direction of the contact blade, at least over the greatest portion of its length. It is obvious that a cleaning element which is knife-like or spatula-like in design can effectively and completely scrape a layer of paint off one of the two main surfaces of a contact blade. This also applies for the case in which it is, for example, the lower narrow side or one of the edges extending in the longitudinal direction of the contact blade which is to be cleaned. With a cleaning element which is knife-like or spatula-like in design it is also possible to avoid the groove-like recesses which result on the contact blade due to intensive brushing with a steel brush, a cleaning element scraping along the contact blade is very much simpler and therefore cheaper than a brushing device and, in addition, the complicated control means for pivoting the known brushing device in and out can be dispensed with. Finally, the dust development which is unavoidable when brushing off burnt-in paint can be prevented, a quite considerable advantage for a paint plant, in which dust can lead to a serious reduction in quality, if not to rejects.

With the inventive cleaning device even burnt-in paint can be removed from the contact blades. However, embodiments are preferred, in which the cleaning device is arranged upstream of the drier of the paint plant, i.e. between its dip tank and the subsequent drier. In this connection it should be mentioned that it has been established that a special cleaning of the knife-like or spatula-like cleaning elements is not required in either of the two cases because the paint scraped off by the cleaning elements falls or drips from them of its own accord.

It is particularly favorable for the cleaning element to be exchangeably mounted on a holder. The knife-like or spatula-like cleaning element can then be constructed as a relatively small part subject to wear so that replacing it will not lead to costs of any significance.

In order to always ensure an adequately good engagement of the cleaning element on the contact blade to be scraped, embodiments are recommended, in which the cleaning element is displaceable in the direction towards the region of the contact blade to be cleaned due to the action of a pressure means. In order, in addition, to be able to adapt the surface pressure of the cleaning elements to the requirements, the tension of the pressure means is alterable in preferred embodiments, e.g. in that one support of a spring forming the pressure means is designed to be adjustable.

In order to ensure that the contact blade can pass by the cleaning element, or vice versa, without any problem, in particularly advantageous embodiments of the inventive cleaning device the feed direction of the cleaning element, i.e. the operative direction, for example, of the pressure means, forms an obtuse angle (pitch angle) with the direction of the movement of the contact blade relative to the cleaning element. This means that, for example, so-called chatter marks on the contact blade can be avoided. Embodiments are particularly preferred, in which this pitch angle is adjustable.

In preferred embodiments of the inventive cleaning device, a plurality of cleaning elements are provided and these can engage on different regions of the contact blade and/or be arranged one behind the other in the longitudinal direction of the contact blade. The latter serves the purpose of safely removing even tenacious dirt from the contact blade.

Since the skids do not always take up exactly the same position relative to the conveyor, embodiments of the inventive cleaning device are preferred, in which a carrier supporting the cleaning element or elements is arranged on the skid so as to be freely displaceable transversely to the longitudinal direction of the contact blade for automatic adjustment of the cleaning device to the contact blade to be cleaned. It is, of course, sufficient for the possible path of displacement of the carrier to be relatively small since it need only be adjusted to the possible position tolerances of the skids in relation to the conveyor. When the edge of the contact blade first entering the cleaning device is designed like a knife edge and the cleaning element is arranged so as to be elastically resilient, the freely displaceable carrier would, as such, be completely adequate for preventing damage to the cleaning device by the contact blade; the specified carrier need not even be displaceable transversely to the longitudinal direction of the contact blade. In a preferred embodiment of the inventive cleaning device, the carrier is, however, connected with at least two centering elements for centering the carrier relative to the contact blade. The contact blade entering the cleaning device is displaceable between these centering elements and inclined surfaces serving to center the carrier are provided on the centering elements and/or the contact blade. In this way, the contact blade is reliably prevented from striking against regions of the cleaning device or the cleaning elements which cannot evade the contact blade.

In order to prevent the metallic contact blade striking against metallic parts of the cleaning device even before the scraping process commences, the cleaning element is provided with a plastic butting block for the contact blade which ends immediately adjacent the operative edge of the cleaning element and has an inclined butting face for the contact blade. Normally, the contact blade extends in the transport direction of the skid or the conveying direction of the conveyor; in this case, the contact blade can be cleaned with the aid of the inventive cleaning device as it passes through so that neither a drive for the cleaning device nor any stopping of the conveyor for cleaning a contact blade is required whereas the known cleaning of the contact blades by means of rotating brushes makes it necessary to stop the conveyor, and for the simple reason that otherwise the brushing time and the intensity of the brushing would not be sufficient.

In principle, an inventive cleaning device can also be used in cases in which the contact blade extends transversely to the conveying direction and/or the contact blade is arranged "in the slipstream" of a part or region of the car-body carriage. In this respect, the cleaning device is then provided with drive means for moving the cleaning device into and out of the path of the contact blade as well as for moving the cleaning device along the stopped contact blade. However, it is not then possible to clean the contact blades as they are passing through. On the contrary, the conveyor mounting the car-body carriages must be stopped for a short time to enable the contact blades of the skids to be cleaned.

Figure 2:
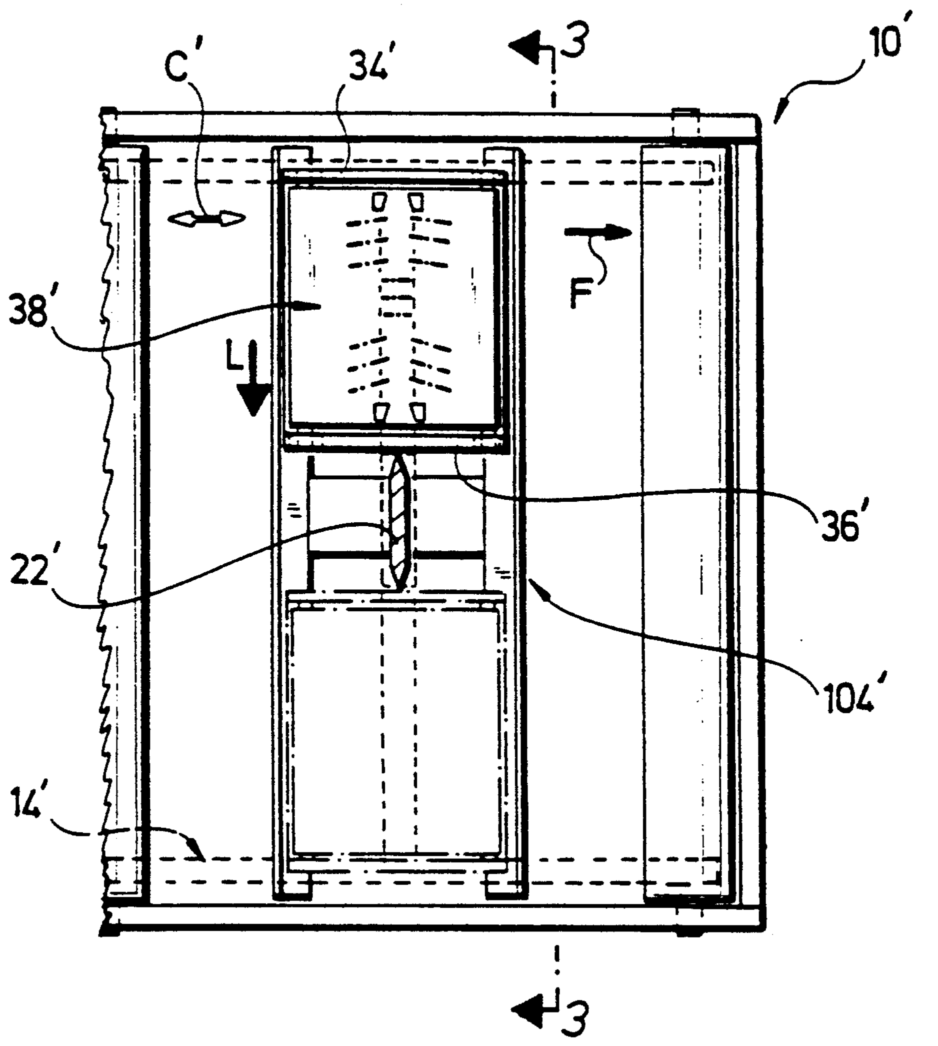
Figure 3:
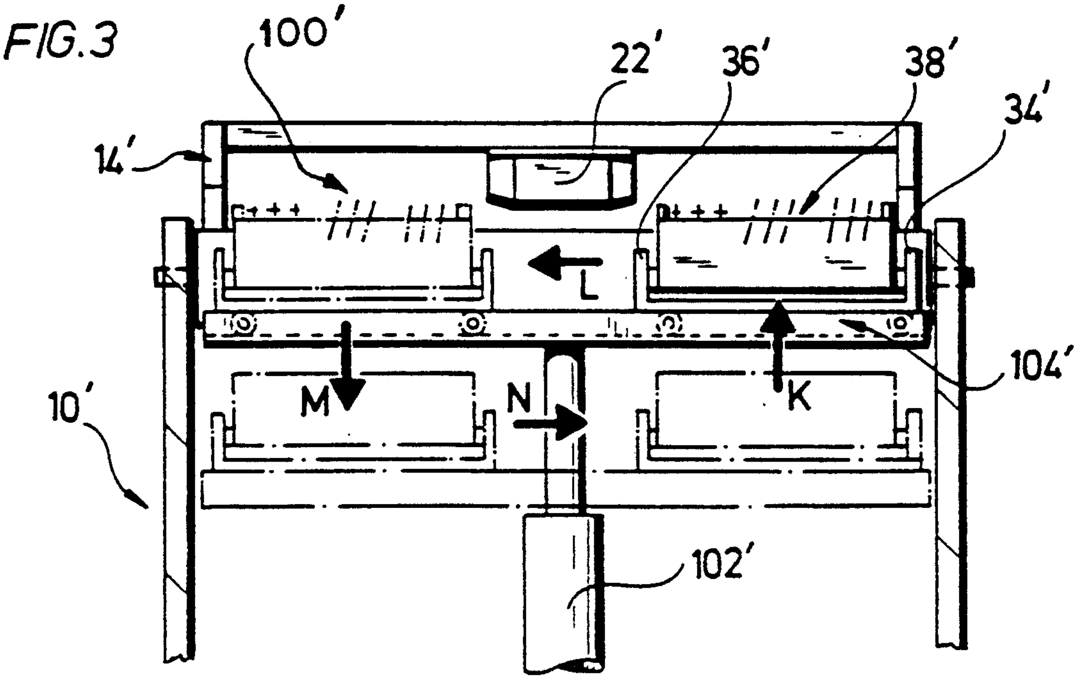
Figures 4, 5:
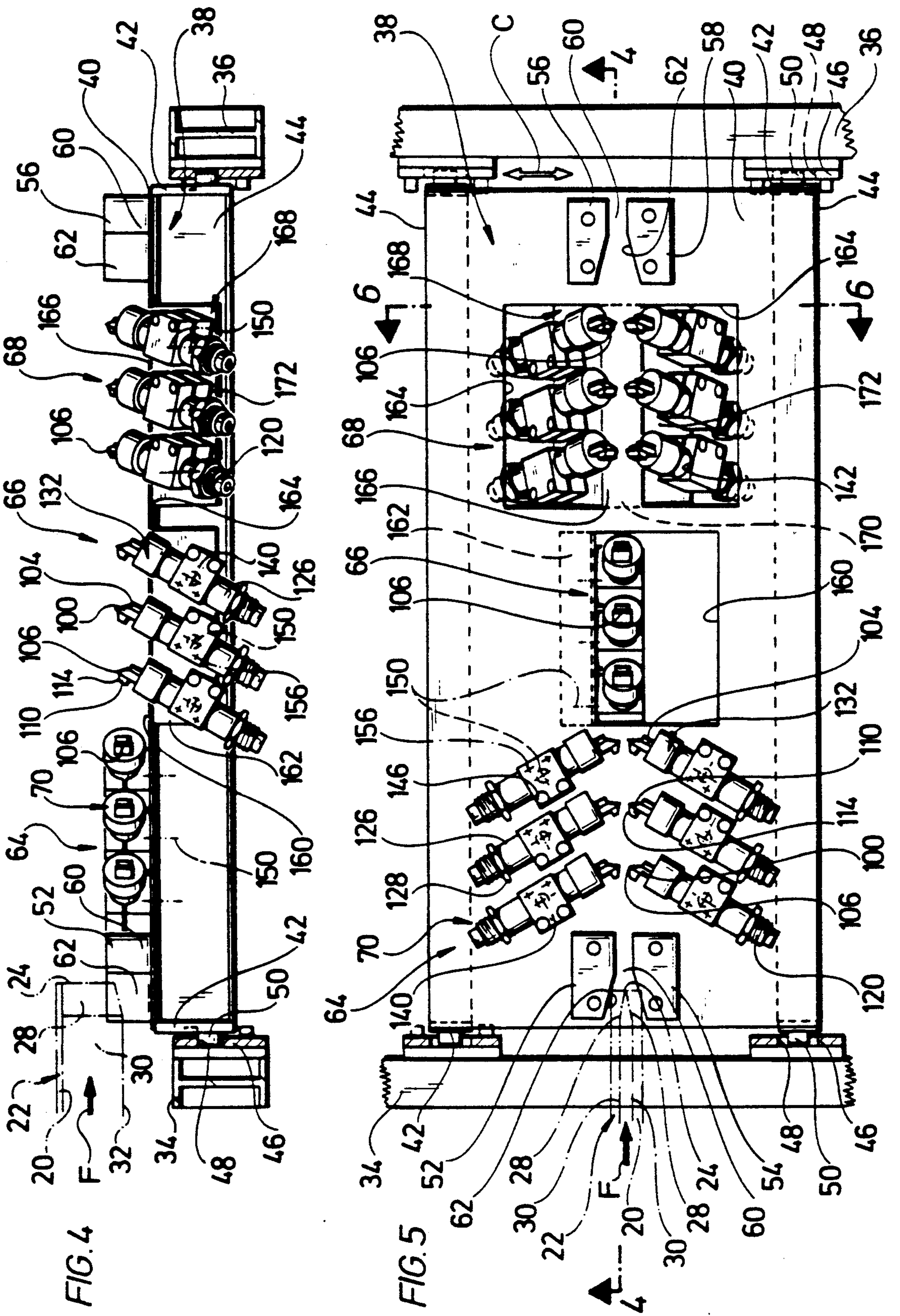
Figure 6:
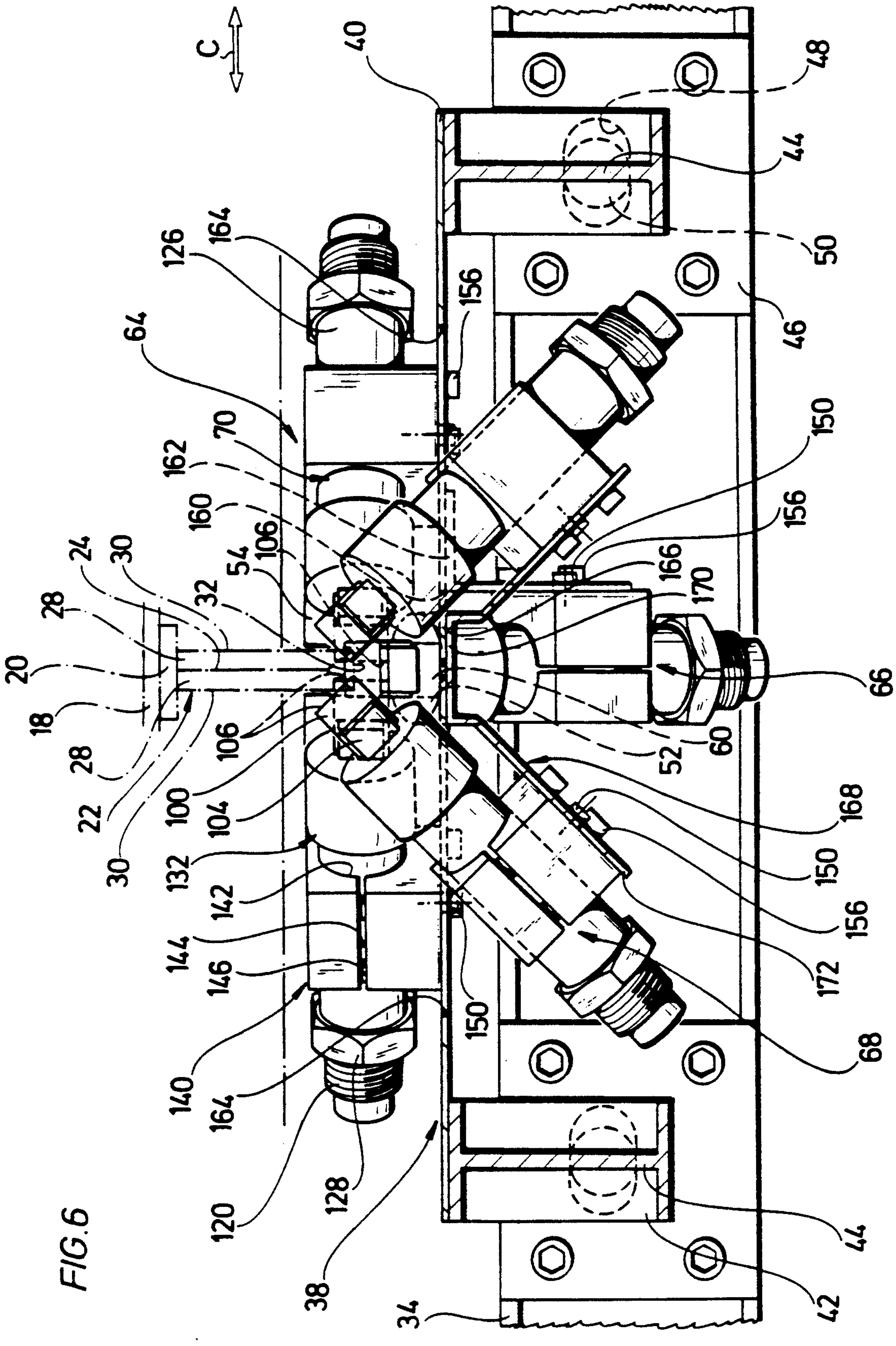
Figures 7, 8, 9:
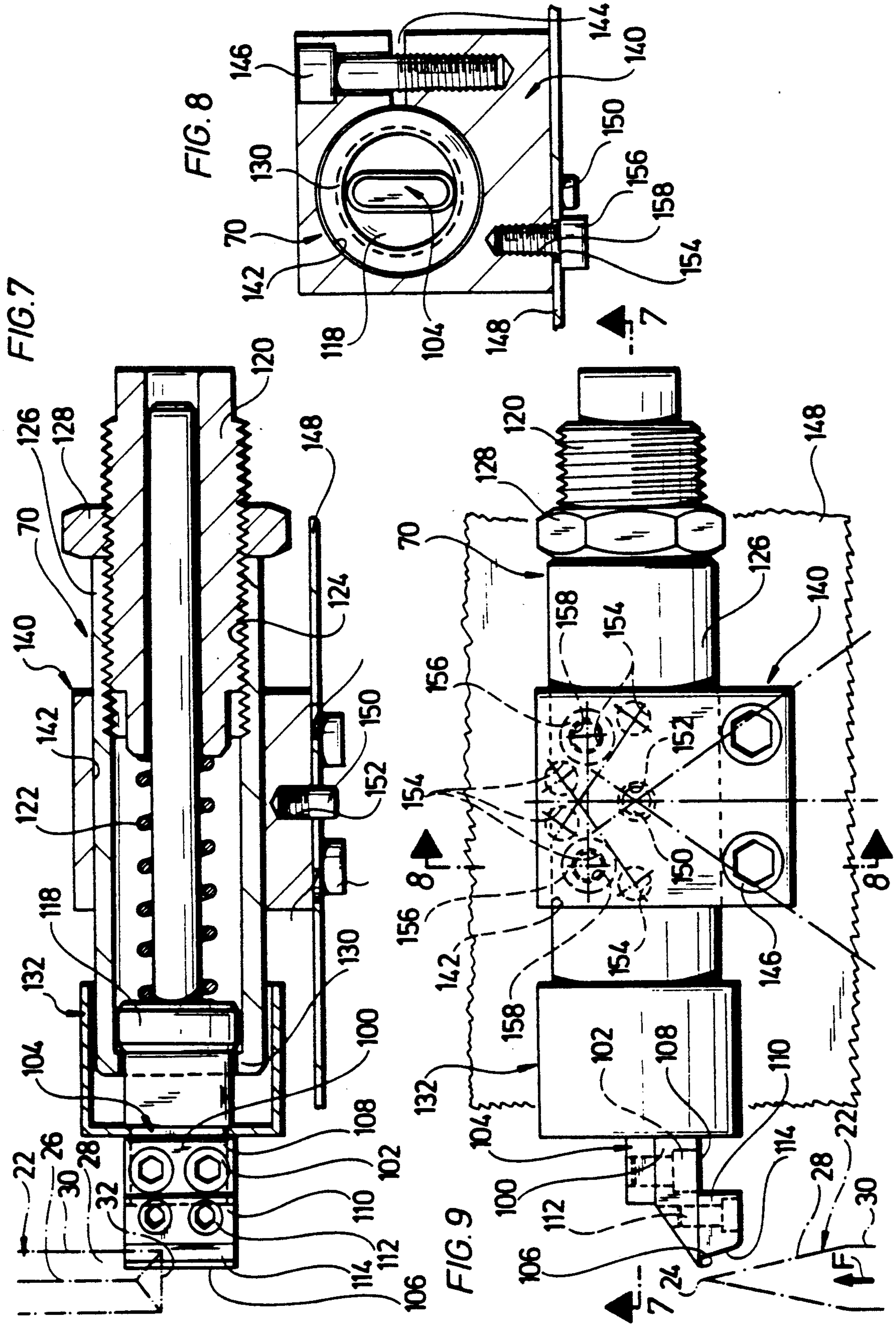

Additional features, advantages and details of the invention result from the following description as well as the attached drawings of two preferred embodiments of the invention cleaning device. In the drawings, FIG. 1: is a diagrammatic illustration of part of a conveyor of a cathodic dip electropriming plant mounting a car-body skid comprising a contact blade extending in the conveying direction and with a first embodiment of the inventive cleaning device for cleaning the contact blades as they pass through;

FIG. 2: is a plan view of a second embodiment of the inventive cleaning device, illustrating a short section of the conveyor and a short section of a car-body skid mounted thereon and comprising a contact blade extending transversely to the conveying direction and showing the cleaning device in two different positions, one in solid lines and one in dash-dot lines;

FIG. 3: is a section through the second embodiment, i.e. a section along line 3—3 in FIG. 2, illustrating the four extreme positions of the cleaning device;

FIG. 4: shows the cleaning device of FIG. 1, partially in a side view and partially in the section along line 4—4 in FIG. 5;

FIG. 5: is a plan view of the cleaning device according to FIG. 1;

FIG. 6: is a section along line 6—6 in FIG. 5;

FIG. 7: shows a constructional unit of the cleaning devices according to FIGS. 1 to 6, consisting of a cleaning element with holder, and in a section along line 7—7 in FIG. 9;

FIG. 8: is a cross section through this constructional unit along line 8—8 in FIG. 9, and FIG. 9: is a plan view of this constructional unit, seen in the direction of arrow "A" in FIG. 7.

FIG. 1 shows a section of a conveyor 10 designed as a rollerway, the transport rollers 12 of which support the carriages carrying the motor vehicle bodies to be painted. The transport rollers are driven by means not illustrated. FIG. 1 illustrates a carriage or skid 14 of this type which consists essentially of longitudinal supports forming runners 16 and transverse supports 18 which are arranged at a higher level and connect the two runners with each other. A longitudinal support 20 is attached to the underside of one of the transverse supports 18. Attached to the underside of this longitudinal support is a contact blade 22 which extends in the conveying direction F and projects downwardly from the longitudinal support 20. The contact blade 22 is, like the remaining components of the skid 14, a metal part which, as will be shown later on, has a shuttle-like profile in a horizontal cross section with a front edge 24 and a rearward edge 26 adjoined by inclined faces 28. These form, together with the respective edge 24 or 26, wedge-shaped sections of the contact blade, between which the latter has plane main surfaces 30 extending parallel to one another. A plane, lower narrow side of the contact blade is designated as 32.

FIG. 1 shows a section of the conveyor 10 which is located between a dip tank for carrying out the cathodic dip electropriming of the vehicle bodies to be painted and a drier for burning in the paint. Neither of these is illustrated since they are parts of known paint plants.

The section of the conveyor 10 illustrated in FIG. 1 has two transverse supports 34 and 36 arranged between two transport rollers 12*a* and 12*b*. A carrier 38 extending substantially horizontally is arranged between these transverse supports. As will be shown later on, this carrier 38 is held on the transverse supports 34 and 36 so as to be freely displaceable in the direction of double-headed arrow C in a horizontal direction transversely to the conveying direction F and it is part of the inventive cleaning device for scraping the paint coating off a contact blade 22 coming from the dip tank or from certain regions of this contact blade.

First of all, the design of the first embodiment of the inventive cleaning device illustrated in FIG. 1 will be explained in greater detail on the basis of FIGS. 4 to 6.

As shown in FIGS. 4 and 5, the carrier 38 is a plate-like component forming a hollow chamber which opens downwardly and is defined by a cover plate 40 and four side walls 42 and 44 adjoining the cover plate like a frame. Guide plates 46 are secured to the facing sides of the transverse supports 34 and 36. Each of these guide plates 46 has a short guide groove 48 which extends horizontally, i.e. in the direction of the double-headed arrow C, and a pin or roller 50 of the carrier 38 engages in each of these grooves so that the carrier can be freely displaced in horizontal direction and transversely to the conveying direction F over a certain short distance. This measure serves to enable the carrier 38 to be centered automatically in relation to an incoming contact blade 22. As additional means for achieving this self-centering, centering elements 52 and 54 as well as 56 and 58 are secured to the cover plate 40 of the carrier 38. These centering elements are, in particular, plastic blocks. Each pair 52, 54 and 56, 58, respectively, of centering elements encloses therebetween a through gap 60, the left-hand end region of which, according to FIG. 5, broadens contrary to the conveying direction F because in this region the centering elements are provided with inclined butting surfaces 62 for the incoming contact blade 22. The through gap 60 narrows behind the butting surfaces 62 to a gap width which is only slightly greater than the width or thickness of the contact blade 22 having the paint coating to be removed. In principle, the preferred, illustrated embodiment need be provided with centering means only on the inlet side of the carrier 38, i.e. on the left side of the carrier 38 according to FIG. 5, because the carrier 38, when the incoming contact blade 22 has again left the through gap 60, will be kept centered in relation to the contact blade automatically by the cleaning elements still to be described.

The illustrated, preferred embodiment of the inventive cleaning device has three groups 64, 66 and 68 of scrapers 70 which are all preferably designed the same and the construction of which will be described in greater detail on the basis of FIGS. 7 to 9. The scrapers 70 of the first group 64 scrape off the paint layer from the regions of the inclined faces 28 and the two main surfaces 30 of a contact blade 22 passing through the cleaning device, these regions being strips extending in the conveying direction F. The scrapers 70 of the second group 66 scrape the lower narrow side 32 of the contact blade and the scrapers of the third group 68 serve to expose the lower longitudinal edges of the contact blade which are located between the lower narrow side 32 of the contact blade, on the one hand, and the main surfaces 30 as well as the inclined faces 28, on the other hand.

The construction of one of the scrapers will now be described on the basis of FIGS. 7 to 9. This is a scraper belonging to the first group 64.

Each scraper has a cleaning element 100 which is knife-like or spatula-like in design, is attached to a holder 104 by screws 102 and the scraping edge 106 of which preferably extends transversely to the longitudinal direction of the holder 104. In accordance with the invention, a butting element 110 in the form of a small block is attached by screws 112 to the forward main surface 108 of the cleaning element 100, in relation to the conveying direction F. This butting element preferably consists of a hard plastic and has an inclined butting face 114 for the incoming contact blade 22 which ends directly adjacent the scraping edge 106 but slightly spaced therefrom in order, on the one hand, to prevent the incoming contact blade from striking hard against the cleaning element 100 but, on the other hand, not to impair its scraping action.

The holder 104 provided with a stop collar 118 is held in a threaded sleeve 120 so as to be longitudinally displaceable and a helical spring 122 acting as pressure spring is located between this threaded sleeve and the stop collar 118. The threaded sleeve is screwed into an internal thread 124 of a housing 126 and may be fixed in position relative to this housing with a check nut 128. This tubular housing 126 has at its front end a stop shoulder 130 cooperating with the stop collar 118 and determining the forward end position of the cleaning element 100. The cleaning element 100 can be pressed rearwardly from this forward end position by the contact blade 22 to be cleaned and contrary to the action of the helical spring 122, whereby the bearing pressure with which the scraping edge 106 abuts on the contact blade 22 may be adjusted with the aid of the threaded sleeve 120. Finally, a protective cap 132 is mounted on the holder 104 and covers the forward end of the housing 126.

The housing 126 is held in a clamping block 140 which has a circular-cylindrical opening 142 for the housing and a slit at 144 so that the housing 126 can be fixed in position in the clamping block 140 with the aid of tightening screws 146. By rotating the housing 126 in the opening 142, the orientation of the scraping edge 106 in relation to the contact blade 22 can be freely selected. The manner in which the clamping block 140 is secured to a support plate 148 also serves the same purpose. This support plate is provided with a pivot pin 150 which engages in a circular-cylindrical blind hole 152 of the clamping block 140. Moreover, the support plate 148 has a series of holes 154, through which setscrews 156, which may be screwed into two threaded bores 158 of the clamping block 140, can engage. Since the holes 154 are arranged on a circular arc about the axis of the pivot pin 150, in the illustrated embodiment the clamping block 140 can, as shown in FIG. 9, be fixed in three different angular positions on the support plate 148. In this way it is possible to alter the orientation of the longitudinal axis of the scraper 70 in relation to the contact blade 22. In this respect, it is, of course, possible to provide more than three possible angular positions by, for example, using only one setscrew 156 or providing the support plate 148 with more than six holes 154.

In the embodiment illustrated in FIGS. 4 to 6, the clamping blocks 140 of the first scraper group 64 are mounted on the cover plate 40 of the carrier 38, i.e. the cover plate 40 forms, for the first scraper group 64, the support plate 148 according to FIGS. 7 to 9.

For the second scraper group 66, the cover plate 40 has an opening 160, through which the scrapers 70 of this group protrude. They are secured to an angled holder plate 162 which, for its part, is secured to the underside of the cover plate 40.

For the scrapers of the third group 68, the cover plate 40 has two openings 164, between which a web 166 of the cover plate 40 extends. A holder plate 168, which is designed to be approximately in the shape of a gable roof when seen in the section at right angles to the conveying direction F, is secured to the underside of the web. This holder plate has a securing region 170 extending parallel to the cover plate 40 and two inclined regions 172, on which the clamping blocks 140 of the scrapers 70 are mounted, whereas the securing region 170 is connected, e.g. welded, to the web 166 of the cover plate 40. For the scrapers 70 of the third group 68 the regions 172 of the holder plate 168 therefore form the support plate 148 according to FIGS. 7 to 9 whereas for the scrapers 70 of the second group 66 the holder plate 162 forms the support plate 148 according to FIGS. 7 to 9.

The second embodiment has merely been schematically illustrated in FIGS. 2 and 3. It will now be described in the following only insofar as this is required in order to explain the differences between this embodiment and the first embodiment according to FIGS. 1 and 4 to 9.

Whereas in the first embodiment the contact blades 22 are cleaned as they pass through so that it is not necessary either to stop the conveyor 10 and with it the skids 14 temporarily or to provide drive means for the cleaning device, in the second embodiment according to FIGS. 2 and 3 the conveyor 10' has to be temporarily stopped to clean the contact blade 22' of a skid 14'. Moreover, drive means must be provided for the cleaning device in order to lift and lower this and also to be able to displace it transversely to the conveying direction F.

In this second embodiment, the contact blades 22' extend transversely to the conveying direction F. The cleaning device designated as a whole as 100' may, in accordance with the arrows K and M (cf. FIG. 3), be raised to the level of the contact blades 22' or be lowered downwardly out of path of the skids 14', and of all their parts, by means of a lifting cylinder 102' which bears a support and guide frame 104' for the cleaning device 100'. The latter is designed like a carriage which can be driven back and forth in the direction of the arrows L and N on the support and guide frame 104' with the aid of drive means, which are not shown, for the purpose of cleaning the contact blade 22' of a stopped skid. The cleaning device 100' has a carrier 38' which is designed analogously to the carrier 38 of the first embodiment and is equipped with centering elements and scrapers in the same manner as the carrier 38 of the first embodiment. It may also be freely, but limitedly, moved back and forth in the direction of the double-headed arrow C' (cf. FIG. 2) in order to center the carrier 38' automatically in relation to the contact blade 22' to be cleaned when the carrier 38' passes the contact blade. The means for achieving this free displaceability of the carrier 38' correspond to the means provided for this purpose in the first embodiment and so it need only be mentioned that the carriage of the cleaning device 100' has transverse supports 34' and 36' which correspond in their function to the transverse supports 34 and 36 of the first embodiment.

In the second embodiment, once a skid 14' has been stopped so that its contact blade 22' is located above the cleaning device 100', the latter is lifted according to arrow K (cf. FIG. 3), the cleaning device 100' is then displaced past the contact blade 22' in accordance with arrow L and this blade thereby cleaned, whereupon the cleaning device 100' is lowered again in accordance with arrow M and then moved into its initial position in accordance with arrow N. The present disclosure relates to the subject matter disclosed in German application No. P 41 03 171.7 of Feb. 2, 1991, the entire specification of which is incorporated herein by reference.

I claim:

1. The combination of a conveyor for use in a plant for cathodic dip electropriming of vehicle-bodies, a vehicle-body skid to be carried by and moved in a conveying direction along said conveyor, said skid having a rib-like or blade-like contact element thereon for travelling along a first path extending in said conveying direction with said contact element having an electrically conductive surface portion, and cleaning means operably associated with said conveyor for removing paint from said conductive surface portion of the contact element, said conductive surface portion extending at least substantially parallel to said conveying direction and said cleaning means having a holder on which at least one scraper blade is mounted for resiliently engaging the conductive surface portion of the contact element of the skid passing said cleaning means.

2. The combination of a conveyor for use in a plant for cathodic dip electropriming of vehicle-bodies, a vehicle-body skid to be carried by and moved in a conveying direction along said conveyor, said skid having a rib-like or blade-like contact element thereon for travelling along a first path extending in said conveying direction with said contact element having an electrically conductive surface portion, and cleaning means operably associated with said conveyor for removing paint from said conductive surface portion of the contact element, said conductive surface portion extending laterally to said conveying direction and said cleaning means having a carrier, a blade holder on the carrier, drive means for moving said carrier along a second path extending laterally to said conveying direction, and at least one scraper blade mounted on the holder for resiliently engaging the conductive surface portion when passing said contact element.

3. The combination as claimed in claim 2, wherein said drive means is adapted to move said scraper blade into and out of said first path of the contact element.

4. The combination as claimed in claim 1, wherein the scraper blade is exchangeably mounted on said holder.

5. The combination as claimed in claim 2, wherein the scraper blade is exchangeably mounted on said holder.

6. The combination as claimed in claim 1, wherein said cleaning means includes a carrier having biasing means for pressing the scraper blade in a contacting direction against the conductive surface portion of said contact element.

7. The combination as claimed in claim 2, wherein the carrier is provided with biasing means for pressing the scraper blade in a contacting direction against the conductive surface portion of said contact element.

8. The combination as claimed in claim 6, wherein said biasing means is adjustable regarding the force exerted on said scraper blade in said contacting direction.

9. The combination as claimed in claim 7, wherein said biasing means is adjustable regarding the force exerted on said scraper blade in said contacting direction.

10. The combination as claimed in claim 6, wherein said contacting direction forms an obtuse angle with the direction of movement of said contact element relative to said scraper blade.

11. The combination as claimed in claim 7, wherein said contacting direction forms an obtuse angle with the direction of movement of said contact element relative to said scraper blade.

12. The combination as claimed in claim 10, further including angle adjustment means on said carrier for adjusting said obtuse angle.

13. The combination as claimed in claim 11, further including angle adjustment means on said carrier for adjusting said obtuse angle.

14. The combination as claimed in claim 1 or 2, comprising a plurality of scraper blades engageable on different regions of the contact element.

15. The combination as claimed in claim 14, wherein said contact element has two lateral main surfaces on both sides of a bottom surface of the contact element, and at least three scraper blades are provided for engagement on said two lateral main surfaces as well as on said bottom surface.

16. The combination as claimed in claim 1, wherein said contact element is an elongated contact element with a longitudinal direction thereof and wherein a plurality of scraper blades are arranged one behind the other in the longitudinal direction of the contact element for engaging said conductive surface portion.

17. The combination as claimed in claim 2, wherein said contact element is an elongated contact element with a longitudinal direction thereof and wherein a plurality of scraper blades are arranged one behind the other in the longitudinal direction of the contact element for engaging said conductive surface portion.

18. The combination as claimed in claim 1 or 2, wherein said contact element is an elongated contact element with a longitudinal direction thereof and wherein guide means is provided for supporting and for guiding a carrier for the blade holder transversely to the longitudinal direction of the contact element for automatic adjustment of the carrier relative to the contact element.

19. The combination as claimed in claim 18, wherein for centering the carrier relative to the contact element, the carrier is provided with at least two centering elements between which the contact element is movable when entering said cleaning means, and wherein for centering the carrier with regard to the contact element, inclined surfaces are provided on at least one of said contact element and said centering elements.

20. The combination as claimed in claim 1, wherein the scraper blade is provided with a butting element, said butting element ending adjacent an operative edge of the scraper blade and having an inclined butting face spaced from said operative edge.

21. The combination as claimed in claim 2, wherein the scraper blade is provided with a butting element, said butting element ending adjacent an operative edge of the scraper blade and having an inclined butting face spaced from said operative edge.

* * * * *